May 28, 1968     A. L. JOHNSON     3,385,646
SPECTACLE TEMPLE HINGE CONNECTION WITH HINGE PIN RETAINER
Filed Sept. 30, 1964
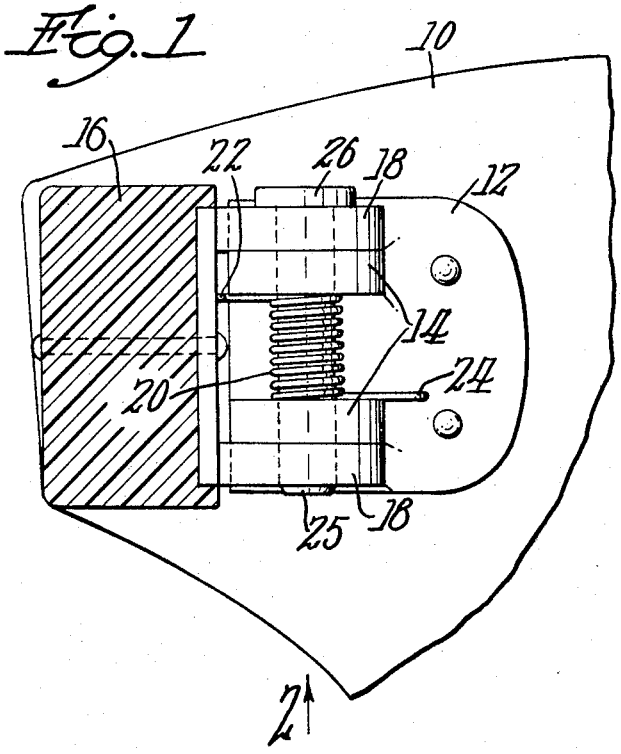
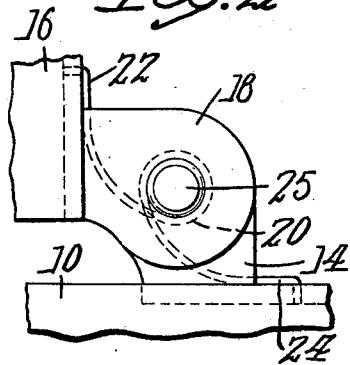
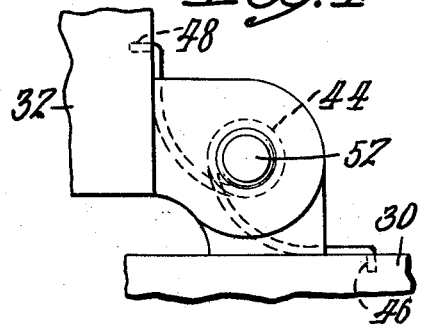
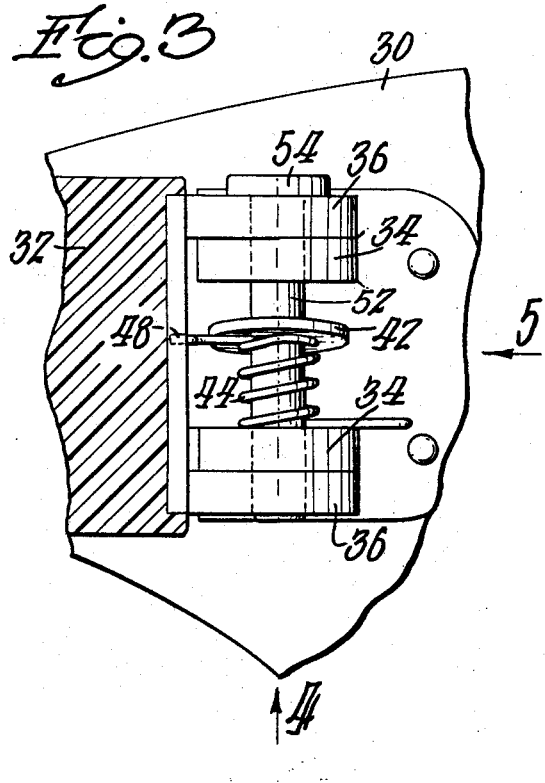
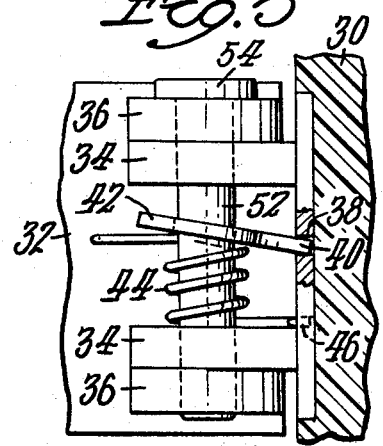
Inventor
Alvin L. Johnson
By Charles R. Fay,
Attorney

United States Patent Office 3,385,646
Patented May 28, 1968

3,385,646
SPECTACLE TEMPLE HINGE CONNECTION WITH HINGE PIN RETAINER
Alvin L. Johnson, Worcester, Mass., assignor to General Industries, Inc., Worcester, Mass., a corporation of Massachusetts
Filed Sept. 30, 1964, Ser. No. 401,766
1 Claim. (Cl. 351—153)

ABSTRACT OF THE DISCLOSURE

A connection for an eyeglass temple and bow including a pintle extending through overlapping bosses on the temple and the bow and including a cockable washer engaging the pin under spring pressure in such a way as to grip it and prevent its accidental loss but at the same time also providing for easy removal thereof in case this should be found to be necessary.

---

This invention relates to a new and improved non-loosening, easily assembled, pivot connection for the temples of eyeglass frames. The principal object of the invention resides in the provision of a novel pin or pintle for the hinge between the temple and the bow, eliminating the necessity for using any kind of tool such as a screwdriver; eliminating screw threads, and other devices that are apt to loosen, and also at the same time providing means automatically urging the temple away from the bow when released by the hands of the user or from a spectacle case.

Other objects and advantages of the invention will appear hereinafter.

Reference is to be had to the accompanying drawings in which:

FIG. 1 is a view partly in section illustrating a form of the invention;

FIG. 2 is a view looking in the direction of arrow 2 in FIG. 1;

FIG. 3 is a view illustrating a modification;

FIG. 4 is a view looking in the direction of arrow 4 in FIG. 3, and

FIG. 5 is a view in elevation partly in section looking in the direction of arrow 5 in FIG. 3.

In illustrating the invention, the reference numeral 10 is used to indicate the bow member upon which is mounted the usual plate 12 having in turn mounted thereon the generally circular bosses 14. There are preferably two of these bosses and they are as usual apertured for the reception of a temple pin or hinge pintle.

The temple is indicated at 16 and the temple may as usual be provided with two apertured bosses lying outside of the bosses 14, 14, the temple bosses being indicated at 18.

Between bosses 14 there is inserted a coil spring generally indicated at 20 and this coil spring is of a size and shape to be held therein by the pin. Its end portions are indicated at 22, 24 and are bent out to engage the bow and the temple to open the latter when released. It will be seen from an inspection of FIG. 1 that this spring cannot escape once it is assembled as recited.

The pin is a common pin of cylindrical form. It is indicated at 25 and it may be provided with a head 26. This pin however has a diameter such that when it is thrust through the bosses 18 and 14 and through the center of the coil spring, it expands the coil spring. In other words, the diameter of the pin is slightly in excess of the interior diameter of the coil spring 20 and thus it will tend to expand it and by this means the coil spring itself will hold the pin in the position shown in FIG. 1. It can be forced out by pressing on it from the lower end thereof but it cannot accidentally fall out nor will it become loosened no matter how often the hinge is exercised by folding the temple onto the bow.

A modification of the invention is shown in FIGS. 3, 4 and 5. In this case the bow is indicated by the reference numeral 30 and the temple by the reference numeral 32. The bow has on it the two apertured bosses 34 which are comparable to those at 14 and the temple has affixed thereto the two similarly apertured bosses 36, these being similar to those at 18.

In this case however the bow is provided with an aperture as at 38 and in this aperture is inserted the tail 40 or a cockable washer 42. This cockable washer tends to be held in the inclined position shown in FIGS. 3 and 4 by means of a coil spring 44. This coil spring can be held in position by having one end extended and engaged in an aperture 46 in the bow and its other end in a similar aperture at 48 in the temple. The spring itself is indicated at 44 and it will be seen that the spring is not only held in position as stated but tends to force apart the temple and the bow. This spring also bears against the cockable washer 42, holding it in the tilted position most clearly shown in FIG. 5.

The pin 52 is similar to that at 25 and it may also have a head 54. It is merely thrust through the apertures in the bosses 36 and 34 through the cockable washer and through the spring. However upon release of the cockable washer, the spring forces it into the inclined position as shown in FIG. 5 wherein its interior edge will of course clearly grasp and hold the pin 52 and prevent it from being retracted.

Thus it will be seen that the pin 54 can be moved in a downward direction through the washer as seen in FIG. 3 because the washer does not tend to hold it against motion in this direction, but once seated it cannot be retracted because the edges of the aperture in the washer tend to grip pin and hold it in position under influence of the spring.

Also in both modifications of the new pintle device, the temple will be automatically extended or pivoted away from the bow upon release of the bow by the hand of the user or by extracting the spectacles from the usual case.

Having thus described my invention and the advantages thereof, I do not wish to be limited to the details herein disclosed, otherwise than as set forth in the claim, but what I claim is:

1. The combination of a temple member and a bow member in an eyeglass frame including spaced pairs of overlapping apertured bosses on the temple bow members, a plain pin extending through the apertures thereof, and means located between said spaced pairs of bosses, acting to impress friction on said pin and restrain the same from accidental retraction from said bosses, said means comprising a cockable washer receiving the pin therethrough, fixed means on one of said members receiving and holding the washer at an edge portion thereof, the cockable washer being engaged and held in operative angled pin-holding position by a coil spring encirculing said pin and by said fixed means, one end of said coil spring bearing on the bow member and the other end thereof, bearing on the temple member and normally tending to force the bow and temple members apart, said washer being releaseable by the application of pressure on said cockable washer against the coil spring pressure at a point on said cockable washer generally diametrical to said fixed means.

References Cited

UNITED STATES PATENTS 2,253,398  8/1941  Reifenberg _____ 16—176

FOREIGN PATENTS 638,638  4/1962  Italy.
963,933  5/1957  Germany.
602,577  5/1948  Great Britain.

P. R. GILLIAM, *Assistant Examiner.*

DAVID H. RUBIN, *Primary Examiner.*